Aug. 4, 1970  A. AST  3,522,857

ANALYTICAL SCALE WITH COARSE AND FINE WEIGHING

Filed Jan. 22, 1968  2 Sheets-Sheet 1

Inventor:
Adolf Ast

By Jackie Davidson
Attorneys

Aug. 4, 1970 A. AST 3,522,857
ANALYTICAL SCALE WITH COARSE AND FINE WEIGHING
Filed Jan. 22, 1968 2 Sheets-Sheet 2
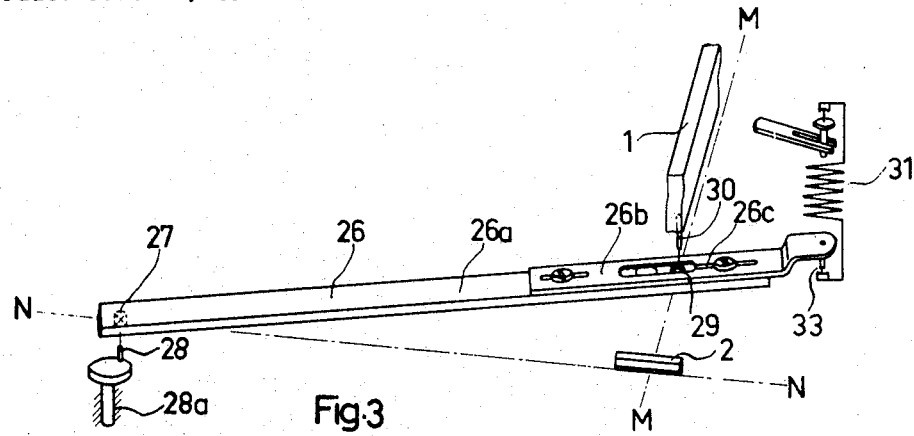
Fig.3
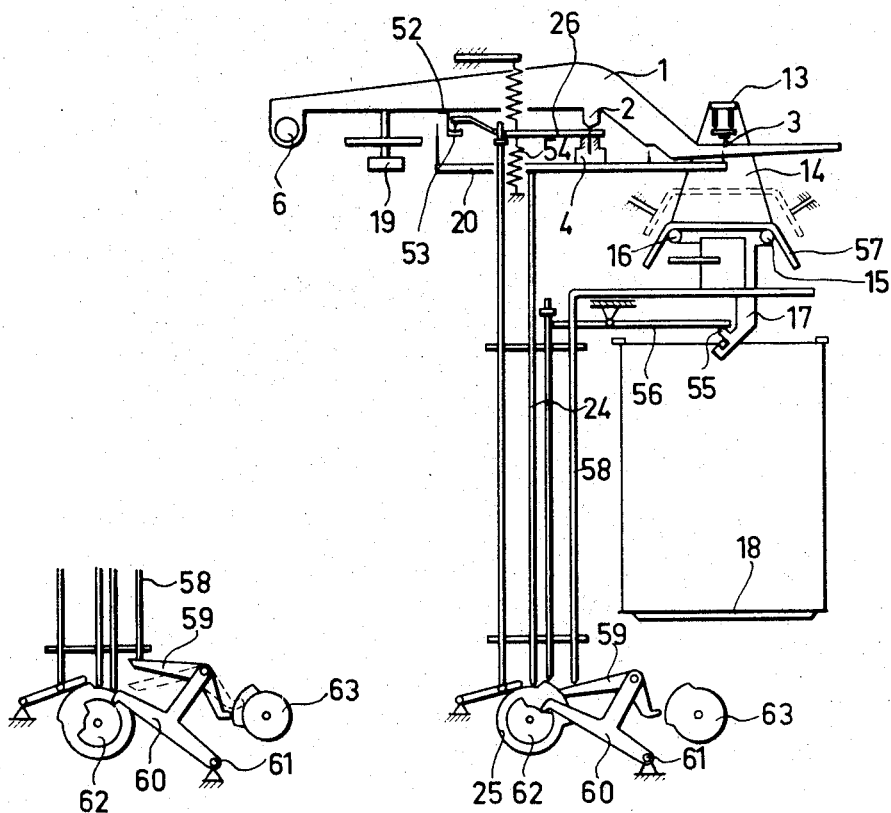
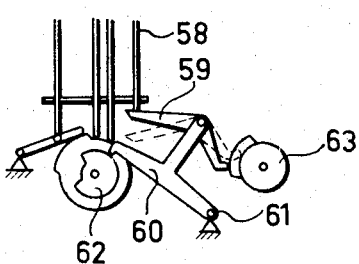
Fig.5 Fig.4
Inventor:
Adolf Ast
By Jacobi & Davidson
Attorneys 3,522,857
ANALYTICAL SCALE WITH COARSE
AND FINE WEIGHING
Adolf Ast, Messstetten, Germany, assignor to August
Sauter KG, Ebingen, Wurttemberg, Germany, a corporation of Germany
Filed Jan. 22, 1968, Ser. No. 699,489
Claims priority, application Germany, Jan. 24, 1967,
1,549,264; July 26, 1967, 1,549,273
Int. Cl. G01g 23/14
U.S. Cl. 177—170                    9 Claims

ABSTRACT OF THE DISCLOSURE

An analytical scale having a fine balance beam adapted to balance about a fulcrum dividing the fine balance beam into two level arms, means for applying a load force to one level arm, means for applying a counterforce to the other lever arm, means coupled to the fine balance beam providing at least a coarse and fine weighing range, and an optical weight indicator mechanism. A coarse balance beam is provided, the coarse balance beam being secured at one end thereof by a pivotal mounting positioned a predetermined lateral distance away from the fine balance beam. Support means for supporting the other end of said coarse balance beam are included such that said coarse balance beam intersects and contacts the fine balance beam at the other lever arm thereof during the coarse weighing range, said support means applying an additional force to said coarse balance beam, said additional force being transmitted to the other lever arm of the fine balance beam by its point of contact with said coarse balance beam.

---

This invention generally relates to weighing apparatus and specifically is concerned with the provision of an improved analytical scale.

Analytical scales of prior-art construction generally comprise a fine balance beam having a highly polished knife line fulcrum adapted to rest upon a flat, highly polished bearing support surface. A counterweight is normally attached to one lever arm of the balance beam whereas an opposing weight is provided and applied to the other lever arm of the balance beam by the material to be weighed. When the force produced by the material to be weighed applied to one lever arm of the balance beam is in predetermined proportion to the force supplied to the other lever arm of the balance beam by the counterweight, the balance beam is in a position of equilibrium about its fulcrum. The angle of inclination or deviation from a zero position assumed by the balance beam when in the equilibrium position can be read off by the operator of the scale as the weight of the material that is being weighed, such reading normally being effected through the use of some optical indicating apparatus.

Prior-art analytical scales are further normally constructed such that two measuring ranges of operation are provided, a coarse measuring range and a fine measuring range, for example. When the analytical scale is in one of these measuring ranges, such as the fine measuring range, an additional force is normally applied to one of the lever arms of the balance beam. This additional force has been produced through the utilization of a flat spring arrangement which can be swung into the deflection or inclination range of the balance beam. The presence of the additional force alters the relationship between the various forces of the balance beam in known manner.

A primary disadvantage of such prior-art analytical scale constructions resides in the fact that the balance beam therein is generally unstable in that the fulcrum provided by the knife line can slip or shift on the polished bearing support by even small shocks to the analytical scale or by small vibrations set up therein. Naturally, such slippage or shifting of the actual fulcrum point of the balance arm has a highly deleterious effect on the weighing operation, both during the fine and coarse measuring ranges.

Accordingly, it is a primary object of the subject invention to provide an improved analytical scale of the general type described in that there is provided both a coarse and fine measurement range, the improved analytical scale, however, being immune to shocks or vibrations. Further, and equally important objects of the subject invention are as follows:

(a) To provide an improved analytical scale in which stability of the balance beam therein is assured;

(b) To provide an improved analytical scale construction wherein undesirable twisting stresses caused by asymmetrical side loading of the balance beam is avoided;

(c) To provide an improved analytical scale construction wherein switching of the analytical scale from a locked position into a weighing position is accomplished smoothly with no vibrations being set up therein; and, (d) To provide an improved analytical scale construction offering speed of operation and great versatility.

The above objects and advantages are implemented in the subject invention in that there is provided an improved analytical scale utilizing a fine balance beam in the general manner as described above. However, a coarse balance beam is additionally provided, the coarse balance beam applying an additional force to the fine balance beam during the coarse measurement range. The coarse balance beam is supported in such a manner as to be pivotally mounted at one end thereof a predetermined lateral distance away from the longitudinal axis of the fine balance beam. The coarse balance beam is constructed so as to preferably extend beneath one lever arm of the fine balance beam generally in the same plane as the longitudinal axis of the fine balance beam but at an angle therewith. The other end of the coarse balance beam is preferably attached to a spring member which sets up the additional force applied to the fine balance beam. Provisions are made so as to bring about the complete balancing of the coarse balance beam, in that the pivotal support at one end of the coarse balance beam is adjustable so as to alter the force effect of the coarse balance beam relative to the fine balance beam and thus to alter the magnitude of the additional force applied.

The improved analytical scale of the subject invention also contemplates the provision of a special arrangement and control of switch weights adapted to be coupled to one lever arm of the fine balance beam to effect an equilibrium thereof as desired. In accordance with the subject invention, it is contemplated that the switch weights utilized are distributed in pairs, each switch weight of a pair being placed symmetrically and to either side of the vertical plane passing through the fine balance beam. Additionally, it is contemplated that each pair of switch weights can be placed into operational effect or removed from operational effect with respect to the fine balance beam in a simultaneous manner by a one-piece angled plunger member. In this fashion, a twisting stress in the fine balance beam and in the load receptacle to which the material to be weighed is placed, such twisting stress being brought about by an asymmetrical side loading of the switch weights, is entirely avoided.

In order to obtain an even greater stability for the fine balance beam during fine balancing operation, the free end of the coarse balance beam is supported under the effects of the additional force during coarse balancing operations by the end of the fine balance beam which carries the free counterweight and with all switch weights laid on, whereas in fine balancing operations, during which the coarse balance beam is lifted off the fine balance beam, there is removed at least one of the switch weights.

The construction and arrangement of the coarse balance beam is such that when the analytical scale is in the coarse weighing range as well as the fine weighing range, the fulcrum provided by the main knife line of the fine balance beam and the bearing support surface is always under a tension. As result, the fulcrum point of the fine balance beam will remain fixed as the fulcrum knife line of the fine balance beam because of this tension, cannot easily slip or slide off the bearing support surface. Because the fulcrum point is constrained to be essentially fixed, an intermediate locking or resting of the fine balance beam during the weighing operation for the purpose of centering the load is rendered superfluous. Previously, such centering of the load of material to be weighed was necessary so as to reduce the instability of the fine balance beam. With the analytical scale of the subject invention, the time for completion of a weighing operation is thus greatly reduced.

The construction of the inventive analytical scale is such that it imparts a further advantage when switching the analytical scale from a rest or lock position into a weighing position. The subject invention contemplates the provision of rods upon which the switch weights utilized in the weighing operation are placed. Such switch weights remain in position on the rods when the analytical scale is switched from the locked position into the weighing position. As a result of such placement of the switch weights, no vibrations are set up during the switching of the analytical scale which would have a detrimental effect during the subsequent weighing procedure.

The invention also directs itself to shaping a coarse balancing spring in such manner that it may aid as well in calming down the load bowl. Thus, a further characteristic of the invention is the force exerting itself upon the load bowl or pan and the suspension attachment, respectively, such force counteracting the initial tension of the coarse balancing beam. The invention teaches that this force can be produced by the weight of a brake plate itself which is flexibly supported at the housing and which rests on a protrusion of the suspension attachment or member.

The invention also teaches a special type of control of the movable striker or plunger for the switch weights by means of a switch lever. Pursuant to the invention, the switch weights can be lifted by means of weight switching levers, such switching levers being movable by means of a link cooperating with all of them.

The invention itself as well as other features thereof will become clear when reference is given to the following detailed description of preferred embodiments taken in conjunction with the appended drawings, wherein:

FIG. 3 is an enlarged exploded view of a coarse balancing beam utilized in the analytical scale of FIGS. 1 and 2;

FIG. 4 is a schematic view of the essential components utilized with an alternative embodiment of inventive analytical scale; and, FIG. 5 is a schematic view showing details of the control mechanism for the fine balancing position depicted in FIG. 4.

Figure 1:
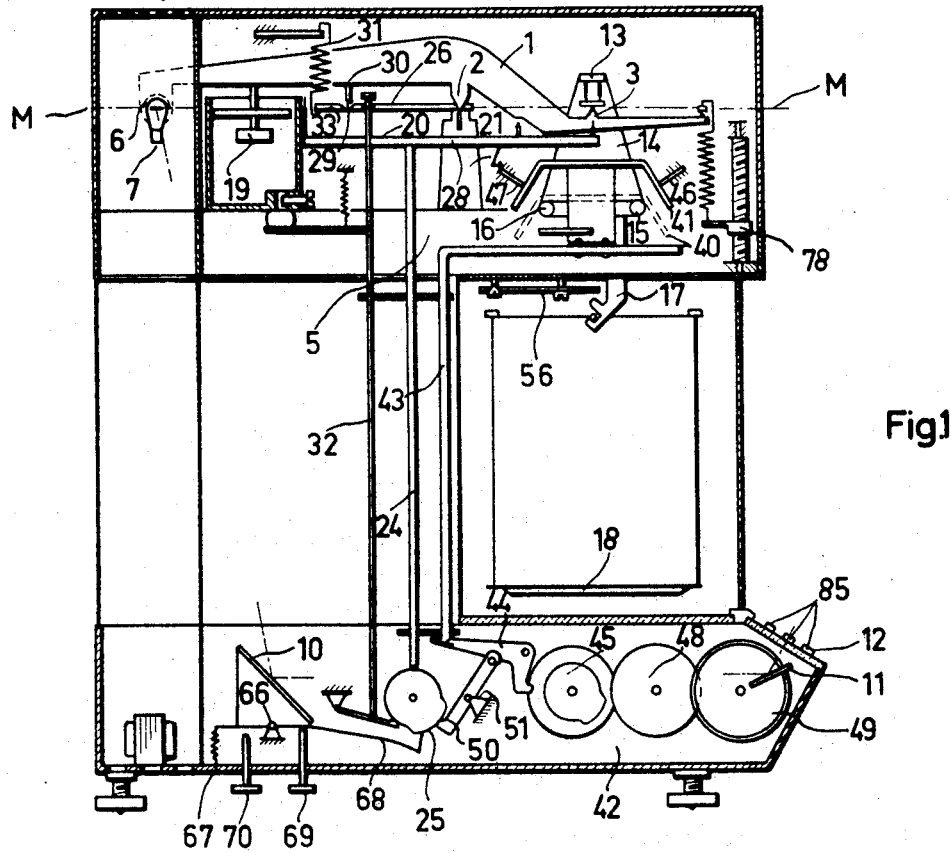
FIG. 1 is a sectional side elevation view of the inventive analytical scale.
Figure 2:
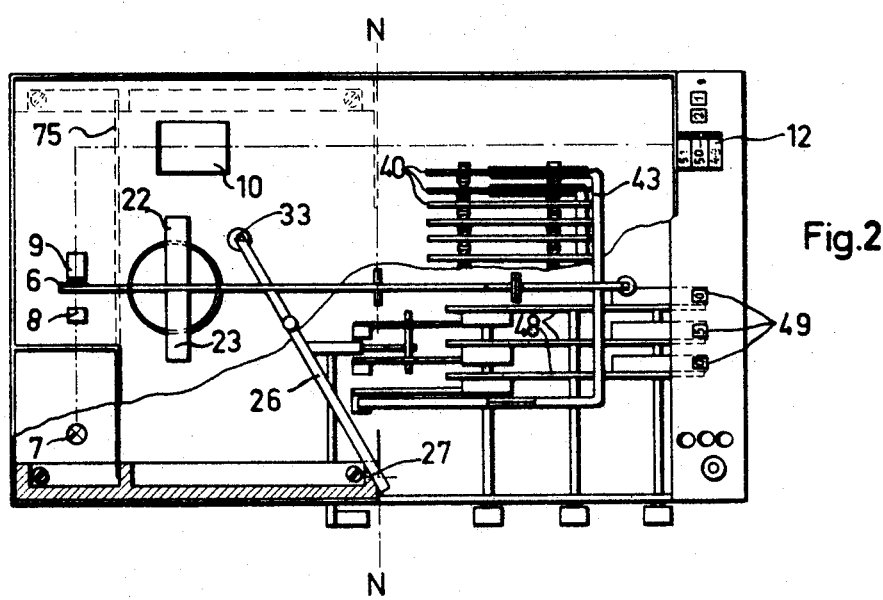
FIG. 2 is a top plan view of the inventive analytical scale of FIG. 1, parts being broken away and in section for illustrative clarity.

Turning now to the drawings and particularly to FIGS. 1 and 2, the analytical scale of the subject invention includes a fine balance beam 1 providing a supporting fulcrum knife edge or line 2 and a loading knife edge or line 3. Fine balance beam 1 is supported by the knife edge or line 2 on a partially illustrated bearing support surface 4, bearing support surface 4 being attached to a mounting plate 5. Both the knife edges or lines 2 and 3 as well as the bearing support surface 4 are highly polished to reduce any friction during operation of the analytical scale.

Indicia or a reading scale 6 is provided at the left hand or rear end of the balance beam 1, the indicia or reading scale on the balance beam 1 being projected and enlarged through the utilization of an illuminating bulb 7 and optical members 8 through 11 onto a mat screen or ground-glass plate 12 such as shown in FIG. 2. The optical system itself will be described in greater detail hereinbelow.

A suspension bridge or apparatus 13 to which is attached a switch weight basket 14, weight placement rods 15 and 16, and a bowl or load receiving pan hooks 17, rest upon the load knife edge or line 3 of the balance beam 1. A bowl or load receiving pan 18 is hung in the lower eyelet of a load receiving hook 17.

A counterweight 19 which is an equilibrium or balancing weight, is attached to the left lever arm of balance beam 1 and also serves as an inclination weight of the balance beam by virtue of its location below the line M—M which runs through the various knife edges 2 and 3. The counterweight 19 gives the balance beam a range of inclination of, for example, 1 gram.

The balance beam 1, in its rest or locked position, is lifted off the bearing support surface 4 and rests upon an arresting carrier or member 20 in supports 21, 22 and 23. Arresting carrier 20 is capable of up and down motion along a vertical axis by an arresting rod 24 mechanically coupled and operated by the rotation of an arresting cam 25. The suspension apparatus or member 13 is likewise lifted off the load knife line 3 when the arresting carrier 20 lifts the balance beam.

A coarse balance beam 26 is provided in the horizontal plane through the longitudinal axis M—M of the fine balance beam. The coarse balance beam 26 is provided at its rear end with a bearing constructed to have a conical notch 27, such as best depicted in FIG. 3. A pin 28 secured to the housing of the analytical scale and adjustable both vertically and laterally is designed to fit into the conical notch 27. Pin 28 is positioned a predetermined lateral distance away from the longitudinal axis M—M of the fine balance beam 1 along the lateral axis N—N of the fine balance beam 1, as shown. The coarse balance beam 26 contacts the fine balance beam 1 at a pin 30 emanating from the fine balance beam and fitting into a bearing hole 29 in the coarse balance beam. The effective lever length of the coarse balance beam 26, that is the distance between the point of contact with pin 30 and the point of contact with pin 28, is adjustable by means of an eccentric 28a. Similarly, the effective length of the lever arm of the coarse balance beam running from the rotational center of the conical notch 27 to an end point of contact 33 with a tension spring 31 is also adjustable by the relative slidable mounting of parts 26a and 26b in the elongated hole 26c. Accordingly, by virtue of the adjustability of the various effective lever arms and lengths, it is possible to alter and adjust the effect of the upward force applied to the fine balance beam 1 by the coarse balance beam 26.

In use, during the coarse measuring range of the analytical scale, the coarse balance beam 26 is contemplated to be adjusted in such a manner that the coarse weighing range of the fine balance beam 1 with the coarse balance beam 26 coupled thereto amounts to an exact decimal multiple of the fine weighing range produced by use of the fine balance beam 1 alone. As mentioned above, during the fine weighing range of the analytical scale, the fine balance beam was designed to have a measuring range or a range of inclination of, for example, one gram. Accordingly, it is contemplated that the coarse measuring or weighing range would comprise, for example, 100 grams.

In addition to altering the effective measuring range of the analytical scale, the positioning as shown of the coarse balance beam 26 is such that a stabilization of the fine balance beam 1 during both the unlocked or rest position and the balancing or weighing position is effected. As will be recalled, the support knife line 2 of the fine balance beam 1 generally sits upon a flat bearing support surface 4 and, considering the construction of the fulcrum point defined by the support knife line 2 and the bearing support surface 4 and the fact that both the knife line and the bearing support surface are highly polished, a possibility exists that the fine balance beam 1 would slide off the proper fulcrum point on the support bearing surface 4 upon the presence of the slightest shocks or vibrations when the analytical scale is in a measuring or weighing mode. Even a slight change in the point of contact of support knife line 2 with the bearing support surface 4 would cause the fine balance beam 1 to change its geometric position in relation to longitudinal axis M—M as well as in relation to the lateral axis N—N, such change in geometric position possibly placing the indicia on the reading scale outside of the effective range of operation of the optical members 7 through 11 and particularly outside of the effective focus area of a lens member 9, for example. Naturally, such change in the position of the fine balance beam 1 and the indicia or reading scale 6 thereon would thus produce a blurred and possibly illegible picture on the mat screen 12.

However, with the analytical scale of the subject invention, such change in position of the balance beam 1 is wholly avoided. This stabilization of the balance beam 1 is effected because pin 30 of the balance beam 1 is supported on bearing 29 of the coarse balance beam 26. The position of pin 30 and thereby of the fine balance beam 1 itself in both the longitudinal axis M—M as well as in the lateral axis N—N is fixed because coarse balance beam 26, through the conical bearing 27 on one end, and through its attachment with bolt spring 31 on the other end, is securely suspended in its relative position to the housing.

The positioning of the coarse balance beam 26 in the manner shown, wherein one end thereof is secured a predetermined distance along the lateral axis N—N of the fine balance beam 1 and wherein the coarse balance beam 26 crosses the longitudinal axis M—M of the fine balance beam 1 at an angle other than 90°, is specifically preferred to ensure proper operation. If the coarse balance beam 26 were positioned directly beneath the fine balance beam 1 along the same longitudinal axis M—M, then stabilization of the fine balance beam 1 could occur primarily only along the longitudinal axis M—M with a minimum amount of stabilization occurring in the lateral direction. On the other hand, if the coarse balance beam 26 was positioned such that it was perpendicular to the longitudinal axis M—M of the fine balance beam 1 and parallel to the lateral axis N—N, then a good stabilization of the fine balance beam 1 could be obtained in both the longitudinal and lateral directions and also against any tendency to twist around the load knife line or edge 3. However, such perpendicular placement of the coarse balance beam 26 would produce undesirable effects when the balance beam 1 and the coarse balance beam 26 are rotated around their respective fulcrum points during the balancing or weighing movements. As will be apparent, a perpendicular placement of the coarse balance beam 26 would effect relative movement between pin 30 of fine balance beam 1 and bearing 29 of the coarse balance beam 26 during the measuring process, such relative movement producing friction during the measurement operation which, of course, could lead to a high degree of error during the gradual balancing of the balance beams 1 and 26. It is for this reason that coarse balance beam 26, at one end thereof, is secured by its conical notch 27 positioned in the lateral axis N—N of the fine balance beam 1 and crosses the longitudinal axis M—M of the fine balance beam 1 at an angle other than 90°. With such a positioning, both pin 30 of fine balance beam 1 and bearing 29 of coarse balance beam 26, during the measurement process, would move on the periphery of the same circle having a center located in the lateral axis N—N. Accordingly, frictional contact between the coarse balance beam 26 and the fine balance beam 1 is virtually eliminated.

Referring again to FIG. 1, it will be seen that the weight basket 14 with the weight placement or load rods 15 and 16 hang from the suspension apparatus or member 13. Various pairs of switch weights 40 along with other switch weights not illustrated are placed serially next to each other on the weight placement or load rods 15 and 16. A switching mechanism or device for the switch weights is provided as shown in the lower part 42 of the analytical scale, such switching mechanism or device serving to place the various switch weights 40 on the load rods 15 and 16 and lift them off therefrom as desired. When the various switch weights 40 are lifted off of the load rods 15 and 16, they are pressed against studs or heads 46 and 47 secured to the housing of the analytical scale. Both the placement and lifting of the switch weights 40 is effected by the operation of various strikers or plungers 43 coupled via various switch levers 44 to a plurality of switch cams 45. The position of the switch weights is numerically shown on indicator rolls 49 as will be discussed hereinbelow and thus on mat screen 12, indicator rolls 49 being operated by gears 48, as shown. Indicator rolls 49 are grouped in accordance with the weight size of the various switch weights 40 or their decimal parts, respectively.

Switch weights 40 are placed onto the load rods 15 and 16 in pairs as discusesd, so as to ensure a balanced loading of the suspension apparatus or member 13. If, for example, 10 grams of weight were to be switched, one 5 gram weight would be placed symmetrically to either side of the longitudinal axis M—M on the load rods 15 and 16. As illustrated, strikers or plungers 43 are constructed so that the upper portions thereof are bent so that both weights of a pair of weights would be switched simultaneously by the same striker or plunger member formed of one piece of material.

Strikers or plungers 43 are placed one next to the other, each striker or plunger 43 serving to switch one pair of switch weights 40. Switch levers 44 and the strikers or plungers 43 in addition to being actuatable by switch cams 45, can be lifted by the motion of the arresting cams 25, such lifting taking place through the coupling of a lock lever 50 pivotally mounted in a stationary bearing 51. During the pre-weighing mode, that is the coarse measuring range of operation, the position of arresting cam 25 is as depicted in FIG. 1 and all strikers or plungers 43 are displaced upwardly through the action of lock lever 50.

Provisions are made in the inventive analytical scale so that the zero value of the measured weight indicator can be set independently during both the coarse and fine weighing ranges. Such setting of the zero value is effected via an adjustable mirror 10 which serves to reflect an optical beam reproducing the reading scale 6 onto the mat screen 12. Adjustable mirror 10 is pivotally mounted around point 66, the degree of angular displacement of the adjustable mirror 10 being set by stop screws 69 and 70. In the position shown, the adjustable mirror 10 is depicted as being pushed against stop screw 69 together with a spring 67 via a flat spring member 68 attached to the arresting cams 25, stop screw 69 being securely mounted to the housing. By turning stop screw 69, the position of the optical beam on the mat screen or ground-glass plate 12 may be shifted, thereby permitting an exact zero setting during the coarse measuring range of operation. On the other hand, when the arresting cam 25 is rotated into a position corresponding to the fine weighing range of the analytical scale, flat spring 68 is released upwardly such that spring 67 draws mirror 10 against the adjusting stop screw 70 also secured to the housing. By adjusting this stop screw 70, it is also possible in this position to adjust the zero setting during the fine weighing range of operation, and specifically independently of the zero point of the coarse measuring range, which of course, is determined by the position of the screw 69.

The operation of the inventive analytical scale above-described is as follows:

COARSE WEIGHING RANGE OF OPERATION

During the coarse weighing range of operation, cams 25 are positioned as shown in FIG. 1. The arresting carrier or member 20 is lowered such that the knife edge or line 2 of the fine balance beam 1 rests on the support bearing surface 4. The suspension member 13 is lowered unto the load knife line or edge 3 of the fine balance beam 1. The load bowl or pan hooks 17 would be detached from a brake or securing plate 56 and the coarse balance beam 26 would be released from a restrained position determined by operation of a control rod 32 and coupled with the fine balance beam 1, as shown in FIG. 3.

All switch weights 40 would then be displaced upwardly by the action of strikers or plungers 43, the switch weights 40 being held against the rigid stops 46 and 47. At this point, the counterweight 19 on one lever arm of the fine balance beam 1 would tend to rotate the fine balance beam 1 in a counterclockwise direction as viewed in FIG. 1. Fine balance beam 1 would rotate in this counterclockwise direction until the restoring force or clockwise force produced by tension spring 31 acting on fine balance beam 1 through the coarse balance beam 26 is sufficient to achieve an equilibrium condition. When such equilibrium is achieved, the zero point or setting of the coarse balancing or weighing range is thus set and can be adjusted to read "00" on the mat screen 12 by rotating mirror 10 by means of screw 69.

Upon loading the load bowl or pan 18 with a load up to the maximum value of all switch weights which have been removed, the force produced by the loading of the material to be weighed acting upon fine balance beam 1 via the knife edge or line 3 causes the fine balance beam 1 to rotate in a clockwise direction until there is again achieved equilibrium between the load and the tension spring 31. If the applied load is equal to the sum of the removed switch weights, then the spring 31 pulls the fine balance beam 1 into the terminal position of 100 grams. The amount of rotation of fine balance beam 1, that is the deflection or inclination produced by the loading of the material to be weighed onto the load bowl or pan 18, is proportional to the weight of the material and can be read on mat screen 12 upon which the indicia or reading scale 6 of the fine balance beam 1 is projected.

Assuming, as described above, that the coarse weighing range of operation has a 100 gram maximum, and further assuming that the load put on has a weight of 50.5021 grams, then fine balance beam 1 will adjust itself such that the reading on mat screen 12 would be somewhere between the value of 50 and 51. Accordingly, the operator of the analytical scale would at this point read off the number 50 and would then set the indicator rolls 49 to read this number, i.e., 50, by turning the switch plate cams 45 until the numeral 50 is shown. Turning of the switch plate cams 45 places the scale in a preparatory position in which later on the indicated number of grams, i.e. 50, are taken off the total switch weight on load rods 15 and 16. During and after this preliminary setting of the switch weights, however, the indication of the coarse value is preserved on the mat screen or ground-glass plate 12.

FINE WEIGHING RANGE OF OPERATION

After the coarse weighing operation has been completed as above described, the operator of the analytical scale would then turn arresting cam 25, pursuant to FIG. 1, so that initially the coarse balance beam 26 will be removed from contact with the fine balance beam 1 through the action of rod 32. Lock lever 50 riding on the arresting cams 25 would serve to release switch levers 44 so that such switch levers 44 are placed into contact with the switch cam 45. It is to be recalled, however, that switch cams 45 have been initially preset by the operator of the analytical scale during the coarse weighing operation such that the numeral 50 has been placed on indicator rolls 49. Accordingly, the plungers or strikers 43 would be vertically lowered or remain in their position. Since the switch cams 45 adjusted during the coarse weighing operation correspond to a removed amount of weight of 50 grams, all the switch weights 40, with the exception of the removed 50 grams of switch weight, would be placed upon the load rods 15 and 16, 50 grams of switch weight being equal to the number shown on the indicator rolls 49.

Accordingly, at this point during the fine weighing operation, we have at one lever arm of the fine balance beam 1 a force produced by the remaining 50 grams of switch weight placed upon the load rods 15 and 16 plus a weight of 50.5021 grams of the weight of the material loaded onto the load bowl or pan 18. Accordingly, acting through the load knife line or edge 3 of the fine balance beam 1, a total weight of 100.5021 grams will be present. On the other hand, the other lever arm of the fine balance beam 1 has the force produced by counterweight 19 acting thereon, counterweight 19 being constructed such that the fine balance beam 1 will be exactly balanced when a load of 100 grams is applied to the knife edge or line 3. The placement and value of counterweight 19 is such that the deflection angle or range of inclination of the fine balance beam 1 will go through the full reading scale when an additional one gram of load, that is a total load of 101 grams are applied to the load knife line or edge 3. Accordingly, on one end of the lever arm, a torque produced by a force of 100.5021 grams will be balanced against a torque, on the other lever arm of the fine balance beam, produced by the counterweight of 100 grams. The unbalanced weight of 0.5021 gram applied to the load knife edge or line 3 of balance beam 1, will cause balance beam 1 to rotate in a clockwise direction until an equilibrium condition is again reached. Since the construction of the balance beam 1 with the counterweight 19 thereon is such that a one gram difference in weight will cause the balance beam 1 to turn entirely through its deflection angle, the excess difference in weight of 0.5021 gram will cause balance beam 1 to adjust itself approximately midway through its maximum deflection angle. Accordingly, a value of 0.5021 can be read on the mat screen 12 after the fine balance beam 1 stops in its equilibrium position. The operator of the analytical scale would then add the value of 0.5021 to the numerical value 50 which is still indicated on the indicator rolls 49 to thus arrive at a total value for the load weight of 50.5021 grams. The actual weighing operation is accordingly completed at this point.

ARRESTING OR LOCKING THE SCALE

After the above-described weighing operation is completed, the analytical scale is arrested or locked by the following procedure. The arresting carrier or member 20 would be raised by rod 24 riding on cam 25 such that the fine balance beam 1 would rest on supports 21, 22, and 23 of the arresting carrier and the load knife line or edge 3 as well as the support knife line or edge 2 would then be lifted off the respective bearing support surface 4 and the suspension apparatus or mechanism 13.

The analytical scale of the subject invention further contemplates the provision of various indicating lamps which serve to clearly indicate to the operator the various positions or modes of operation of the scale, such positions being directed to the arrested or locked position, the pre-weighing or coarse mode of operation, and the fine weighing mode of operation. To this effect, non-illustrated electrical connections are made to the various arresting cams 25, such electrical connections affecting the lighting of signal lamps 85 which could be of various colors such as red, green, or yellow. Additionally, an electrical contact could be made to the taring mechanism 78 such that a signal lamp of the group of signal lamps 85 would light up red whenever the taring mechanism 78 were operated.

Instead of a coarse and subsequent fine balancing operation, a weighing on the same scale can be performed with two measuring ranges and possibly in different weight systems. In this instance, the coarse weighing would correspond to the weighing in weight system "1," for example in the gram system, whereas the fine weighing would correspond to the weight system "2," for example the carat system. In this connection it is also possible to provide scale 6 at balance beam 1 with a second scale reading or row employing other measuring systems which will likewise be faded in during the switch-over from weight system "1" to system "2" and projected upon the mat screen or ground-glass plate 12.

Further, the above-described embodiment of the analytical scale depicted the coarse balance beam 26 as being raised up against fine balance beam 1 by a spring force effected by tension spring 31. It is to be noted, however, that an alternative means of applying the force to coarse balance beam 26 could comprise a non-illustrated weight acting both as a counterweight as well as an inclination weight and, for example, which would be attached to the coarse balance beam 26 and which would raise coarse balance beam 26 against the fine balance beam 1.

Turning now to FIGS. 4 and 5, an alternative embodiment of the subject inventive analytical scale is depicted. Many components of the alternative embodiment of the inventive scale are similar in construction to components utilized in the scale embodiment of FIGS. 1 through 3. For example, a fine balance beam 1 is provided having a support knife line or edge 2, as well as a load knife line or edge 3. The support knife line or edge 2 is similarly rested upon a bearing support surface 4 which is, in turn, provided on a mounting plate attached to the housing. Indicia or a reading scale 6 is likewise associated with the fine balance beam 1 at the left hand portion or rear thereof, the reading scale being similarly projected in an enlarged fashion through an optical device onto a mat screen or ground-glass plate which, in this example, is not illustrated. A suspension apparatus or member 13 is suspended on the load knife line or edge 3, the suspension member or apparatus 13 having attached thereto a switch weight basket 14, load rods 15 and 16 and a load bowl or pan hook 17. The load bowl or pan 18 is hung on the hook 17. A counterweight 19 is likewise provided at the left hand lever arm of the fine balance beam 1, the counterweight 19 causing balancing and angular inclination of the fine balance beam 1 as above discussed. At a result, the fine balance beam 1 has imparted thereto an inclination range of 1 gram.

The fine balance beam 1, when the analytical scale is arrested or locked, is removed from the bearing support surface 4 and rests upon an arresting carrier or member 20 which can be moved upwardly and downwardly by means of an arresting rod 24 acted upon by arresting cam 25. Suspension member 13 is, at the same time as the fine balance beam is placed on the arresting carrier or member 20, also removed from the load knife line or edge 3.

A coarse balance beam 26 is also provided for the fine balance beam 1, but the construction of the coarse balance beam and the fashion in which it imparts force to the fine balance beam 1 differs from that shown in the embodiment of FIG. 1. In this regard, although one end of the coarse balance beam 26 is supported in a conical bearing 27 in a fashion similar to that shown in FIG. 3, the other end of the coarse balance beam 26 is itself supported by means of a pin 52 in a bearing 53 provided on the fine balance beam 1. The force transmitted by the coarse balance beam to the fine balance beam is determined by a spring arrangement 54 which is adjustably tensional between two stationary points on the analytical scale housing. The adjustment of the spring arrangement can be effected in such a manner that the measuring range of the analytical scale in the pre-weighing or coarse measurement range amounts to, for example, 100 grams.

So as to ensure a smooth and frictionless functioning of the analytical scale during coarse measurement, it is important that, at the equilibrium or zero point of the fine balance beam 1, the bearing 53 has applied to it a slight pressure from pin 52 of the coarse balance beam 26. A protrusion 55 is provided on hook 17 and against such protrusion 55 there bears a brake plate 56 which is pivotally supported at the analytical scale housing, so that the slight force imparted to the fine balance beam by the coarse balance beam does not effect an undesirable change of the position of the fine balance beam 1. Brake plate 56, through its own weight, exerts a pressure in a direction which would counteract the additional force applied by the coarse balance beam 26 to the fine balance beam 1 when the fine balance beam 1 is in its zero or equilibrium position. The amount of counteracting force produced by the brake plate 56 arrangement is itself adjustable in that the brake plate 56 can be set vertically or horizontally as desired with respect to the analytical scale housing. Additionally, the amount of force applied by the coarse balance beam 26 to the fine balance beam 1 is itself adjustable in relation to the counteracting pressure of the brake plate 56 since one or both of the stationary suspension points of the spring 54 at the analytical scale housing can be vertically altered.

If the alternative embodiment of the analytical scale were constructed in a fashion wherein the brake plate 56 would not act upon hook 17 and thus the suspension member 13 in the pre-weighing or coarse measuring operation, then there would be no counteracting force acting upon the fine balance beam 1. A substitute force serving the same function can be produced by placing all the switch weights 57 onto the load rods 15 and 16 of the suspension member during the coarse or pre-weighing measurement range. If this were done, at least one of the switch weights 57 would be lifted off the load rods 15 and 16 during the fine weighing range or when the analytical scale is in the arrested or locked position, this action taking place independently of a switch weight value set on weight switch levers 59 and associated parts to be discussed below. Vertically movable plungers 58 similar to the plungers or strikers 43 of FIG. 1 are provided to lift off the switch weights 57 from the load rods 15 and 16, plungers 58 being operated by the weight switch levers 59.

In this alternative embodiment of FIGS. 4 and 5, weight switch levers 59 are supported at their points of rotation upon a rocker arm 60 which is, in turn, pivotally mounted at one end in a joint 61 secured to the analytical scale housing. The other end of rocker arm 60 is designed to rest upon a cam plate 62. The rocker arm 60 and cam plate 62 is designed such that rocker arm 60 comes to rest at the deepest point upon cam 62 when the analytical scale is in the pre-weighing or coarse measuring range. Because of this rest position of rocker arm 60, the point of rotation of the weight switch levers 59 is displaced in a manner such that the weight switch levers do not interact with a weight cam 63. When the analytical scale is in the arrested or locked condition, and during the fine weighing range of operation, the parts above-described assume the position as depicted in full lines in FIG. 5 of the drawings.

As should now be apparent, the objects initially set forth at the outset of this specification have been successfully achieved.

What is claimed is:

1. In an analytical scale having a fine balance beam supported by a knife edge on a supporting surface, means to apply a load weight to one lever arm of the fine balance beam, and means to apply a counterweight to the other lever arm of the fine balance beam, the improvement comprising:

stabilization means for the fine balance beam, said stabilization means comprising a coarse balance beam coupled with the other lever arm of the fine balance beam and applying an additional force thereto.

2. In an analytical scale having a fine balance beam adapted to balance about a fulcrum dividing the fine balance beam into two lever arms, means for applying a load force to one lever arm, means for applying a counterforce to the other lever arm, means coupled to the fine balance beam providing at least a coarse and fine weighing range, and an optical weight indicator mechanism, the improvement comprising: a coarse balance beam secured at one end thereof by a pivotal mounting positioned a predetermined lateral distance away from the fine balance beam; support means for supporting the other end of said coarse balance beam such that said coarse balance beam intersects and contacts the fine balance beam at the other lever arm thereof during the coarse weighing range, said support means applying an additional force to said coarse balance beam, said additional force being transmitted to the other lever arm of the fine balance beam by its point of contact with said coarse balance beam.

3. The improvement defined in claim 2, further including switch means for applying switch weights to the one lever arm of the fine balance beam symmetrically to either side thereof, said switch means including a plurality of plunger members, each plunger member applying a pair of switch weights to the one lever arm of the fine balance beam, each switch weight of a pair being applied to opposite sides of the one lever arm.

4. The improvement defined in claim 2, wherein said additional force applied to the other lever arm of the fine balance beam is in a direction opposing the counterforce.

5. The improvement defined in claim 2, wherein said additional force applied to the other lever arm of the fine balance beam is in a direction aiding the counterforce; further including means for applying a plurality of switch weights to the one lever arm of the fine balance beam during the coarse weighing range and for removing at least one of said plurality of switch weights during the fine weighing range.

6. The improvement defined in claim 5, further including a pivotably mounted brake plate operable upon the one lever arm of the fine balance beam during the coarse weighing range to oppose said aditional force.

7. The improvement defined in claim 5, wherein said means for applying a plurality of switch weights is effective to remove said switch weights applied by switch weight levers actuated by a rocker arm.

8. The improvement defined in claim 2, wherein said support means comprises a spring mechanism.

9. The improvement defined in claim 8, including means for adjusting the point of contact of the fine balance beam with said coarse balance beam.

References Cited

UNITED STATES PATENTS

| | | | |
|---|---|---|---|
| 2,950,100 | 8/1960 | Rapp | 177—203 X |
| 3,026,954 | 3/1962 | Appius | 177—248 |
| 3,055,444 | 9/1962 | Chyo. | |
| 3,168,154 | 2/1965 | Chappell et al. | 177—248 X |
| 3,196,968 | 7/1965 | Chappell | 177—248 |

FOREIGN PATENTS

| | | |
|---|---|---|
| 523,483 | 7/1940 | Great Britain. |
| 591,964 | 4/1959 | Italy. |
| 365,553 | 12/1962 | Switzerland. |

RICHARD B. WILKINSON, Primary Examiner

G. H. MILLER, Jr., Assistant Examiner

U.S. Cl. X.R.

177—203, 227, 248